(12) United States Patent
Miki (10) Patent No.: US 7,594,332 B2
(45) Date of Patent: Sep. 29, 2009

(54) METHOD AND APPARATUS FOR MAKING A CYLINDRICAL BEARING MEMBER

(75) Inventor: Hirofumi Miki, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 763 days.

(21) Appl. No.: 11/107,768

(22) Filed: Apr. 15, 2005

(65) Prior Publication Data

US 2005/0268466 A1    Dec. 8, 2005

(30) Foreign Application Priority Data

Jun. 4, 2004    (JP) .............................. 2004-167634

(51) Int. Cl.
*B21D 53/10* (2006.01)
(52) U.S. Cl. .............................. 29/898.057; 29/898.054; 29/898.1; 29/898
(58) Field of Classification Search ............ 29/898.057, 29/898.054, 898, 898.1, 898.056, 898.04, 29/898.042, 898.02, 898.067; 72/333; 384/283
See application file for complete search history.

(56) References Cited

U.S. PATENT DOCUMENTS 7,334,337 B2 *    2/2008    Matsuura ..................... 29/898

FOREIGN PATENT DOCUMENTS

| GB | 2 128 522 A | 5/1984 |
| GB | 2 400 892 A | 10/2004 |
| JP | 57-070262 | 4/1982 |
| JP | 58-008847 | 1/1983 |
| JP | 59-185539 | 10/1984 |
| JP | 07-004435 | 1/1995 |
| JP | 07-217646 | 8/1995 |
| JP | 10-250818 | 9/1998 |
| JP | 2963652 | 8/1999 |
| JP | 2002-346690 | 12/2002 |

* cited by examiner

*Primary Examiner*—David P Bryant
*Assistant Examiner*—Sarang Afzali
(74) *Attorney, Agent, or Firm*—Dann, Dorfman, Herrell and Skillman; Henry H. Skillman (57) ABSTRACT

A cylindrical bearing member, which can hold lubricating oil in blind grooves as oil reservoirs for a long period of time to exhibit a lubricating function sufficiently, the blind grooves being efficiently mass-produced on the inside of the cylindrical member at low cost. The cylindrical bearing member has an inner circumferential surface having a plurality of blind grooves and is formed as a hollow open-ended cylindrical member with a bottom from a circular column-shaped crude material or blank. The blank includes a tapered inner circumferential surface at its open end. A groove forming die pin including groove forming protrusions is pushed from the open end towards the bottom to obtain a cylindrical member in which a plurality of grooves are formed on the inner surface. The grooving die pin is removed, then the tapered inner circumferential surface of the cylindrical member 107 is returned and straightened to a cylindrical shape to close the grooves at the open end of the member, and then the bottom is removed from the cylindrical member.

2 Claims, 9 Drawing Sheets

METHOD AND APPARATUS FOR MAKING A CYLINDRICAL BEARING MEMBER

TECHNICAL FIELD

The present invention relates to a cylindrical bearing member preferably used as a bushing rotatably fit-inserted with respect to a connecting pin for a chain, and more specifically it relates to a cylindrical bearing member on the inside surface of which a number of blind grooves for reserving a lubricating oil are formed.

BACKGROUND TECHNOLOGY

A cylindrical bearing member has been used as a slide bearing such as a bearing body for a rotating shaft or a bushing for a chain by inserting a shaft, a pin and the like into a pipe-shaped member.

In such a cylindrical bearing member, there have been formed a number of bottomed or blind grooves, serving as oil reservoirs for a lubricating oil. The grooves are parallel to the axial direction on an inner circumferential surface of the cylindrical bearing member for improving the lubricity between the inner circumferential surface for the bearing surface and the shaft, pin or the like.

Namely, the conventional blind groove for an oil reservoir in a cylindrical bearing member has been manufactured by subjecting a pipe-shaped seamless cylindrical blank formed by forging or the like or by milling such as undercutting, broaching or the like, or has been manufactured by forming a blind groove for an oil reservoir on a surface of a thin rectangular basic material such as a band steel, a flat band or the like by pressing, machining or rolling, then forming the rectangular basic material into a cylindrically formed product (cylindrical member) so that the both side edges of the basic material are opposed to each other, and inserting a core punch into the cylindrically formed product to push this product into a circular opening die (see Japanese Patent No. 2,963,652).

Problems to be Solved by the Invention

However, in the conventional cylindrical bearing member manufactured of a cylindrical blank as mentioned above, blind milled grooves serving as oil reservoirs are formed on an inner circumferential surface of the cylindrical member by undercutting, broaching or the like. Thus, the milled blind grooves serving as oil reservoir can only be formed one groove at a time, and the efficiency of forming the blind grooves serving as oil reservoirs is low while the forming of the blind grooves needs long time. Therefore the prior art has problems that it is unsuitable for mass production and disadvantageous in cost.

In the conventional cylindrical bearing member manufactured of a rectangular basic material such as a band steel, a flat band or the like as mentioned above, since an abutted portion of the rectangular basic material remains as a longitudinal seam extending from end to end of the bearing member during forming the rectangular basic material into a cylindrical product, in a case where the cylindrical bearing member is used with a shaft, a pin or the like inserted thereinto, a lubricating oil held in a blind groove as an oil reservoir is liable to flow into the longitudinal seam and the lubricating oil, which flowed into the seam from the blind groove serving as an oil reservoir, flows from the ends of the seam in the longitudinal direction to the outside in an extremely short time. As a result, there are problems that the cylindrical bearing member cannot hold lubricating oil over a long time or maintain the lubricity.

Thus, there are problems to be solved by the invention, and the objects of the present invention are to solve the above-mentioned related art problems and to provide a cylindrical bearing member, which can hold a lubricating oil in blind grooves serving as oil reservoirs for a long period of time and exhibit a lubricating function sufficiently, and to provide a method of manufacturing a cylindrical bearing member, which can be mass-produced at low cost.

Means for Solving the Problems

First, a cylindrical bearing member solves the above-mentioned problems by forming a cylindrical member with a thin bottom by extrusion molding of a circular column-shaped crude material and molding it into a hollow cylindrical member with a thin bottom at one end and an open end at the other end including a tapered inner circumferential surface portion, which is gradually diameter-reduced from the open end toward the thin bottom, and then pushing a groove forming die pin including a plurality of groove forming protrusions from the open end of said cylindrical member toward the thin bottom, the protrusion being pressed into the tapered inner circumferential surface portion and beyond to form a cylindrical member with a thin bottom provided with a plurality of grooves on the inner circumferential surface, the grooves having a closed terminal adjacent the thin bottom, and an open terminal adjacent the open end of the cylindrical member; the die pin for forming grooves is removed; then the tapered inner circumferential surface portion of the formed cylindrical member is straightened into cylindrical form to close the open terminal of the grooves adjacent the open end of the member and provide a work-hardened ring at the one end of the cylindrical bearing member; and after that a thin bottom is removed from the straightened cylindrical member.

As an alternative, a circular column-shaped crude material blank is extrusion-molded into a hollow cylindrical member with a thick bottom and an open end, and a tapered inner circumferential surface portion, whose inside diameter is gradually reduced from the open end toward the thick bottom; a groove forming die pin including a plurality of groove forming protrusions on an outer circumferential surface is pushed into the inner bottom surface of the hollow cylindrical member to make the thick bottom thin; while forming and elongating the innermost end of the tapered inner circumferential surface into a continuous straight cylindrical portion with a thin bottom in which a plurality of grooves are formed on the inner circumferential surface of said straight cylindrical portion, the grooves having a closed terminal adjacent the thin bottom, and an open terminal in the tapered wall; then said groove forming die pin is removed; then said tapered inner circumferential surface of the grooves formed cylindrical member with thin bottom is returned and straightened to a cylindrical shape to close the open ends of the grooves, and provide a work-hardened ring at the one end of the cylindrical bearing member; and the innermost end of said returned and straightened cylindrical portion with the thin bottom is removed.

Further, a cylindrical bearing member according to the invention solves the above-mentioned problems by the fact that a circular column-shaped crude material is extruded to a cylindrical member with a thin bottom; a groove forming die pin including a plurality of groove forming protrusions on a leading portion of the outer circumferential portion and a flared portion gradually diameter-expanded backward on the trailing portion of the outer circumferential portion, is pushed from an opening of said cylindrical member with thin bottom so as to be molded to a cylindrical member with a thin bottom in which a plurality of grooves are formed on the inner circumferential surface and a tapered inner circumferential surface gradually diameter-reduced from an opening end toward the inside; then said groove forming die pin is removed; then said tapered inner circumferential surface of the groove formed cylindrical member with thin bottom is returned and straightened to a cylindrical shape and provide a work-hardened ring at the one end of the cylindrical bearing member; and said returned and straightened cylindrical member with thin bottom is bottom-removed.

The term "a blind groove serving as an oil reservoir" in the present invention means a groove form in which both a proximal terminal end portion and a distal terminal end portion in the longitudinal direction of the groove are closed and sealed.

EFFECT OF THE INVENTION

Since the present invention can exhibit the following unique effects by the above-mentioned configurations, it can exhibit the following unique effects.

In a first embodiment of the invention, a cylindrical member obtained by extruding a circular column-shaped crude material or blank is used, a seam does not exist. Further, since each of the blind grooves formed on the inner circumferential surface is open on only the inner circumferential surface of the cylindrical member, in a case where a shaft, a pin or the like is inserted into a cylindrical inner portion of the cylindrical bearing member and is used as either a sliding or a rotating bearing, the lubricating oil held in blind grooves does not flow out of an end portion of the cylindrical bearing member even by long time use whereby excellent lubricity is maintained.

Further, since in forming the cylindrical bearing member according to the first embodiment, the groove forming die pin including a plurality of protrusions on the outer circumferential surface of the die pin is pushed into the cylindrical bearing member, a plurality of grooves as oil reservoirs can be formed at one time and since, by returning and straightening the tapered inner circumferential surface portion of the cylindrical member to a straight cylindrical shape the sealing of the end portion of the grooves is made at one time, the blind grooves on the cylindrical bearing member can be efficiently formed. Further, since the shape and the number of groove forming protrusions provided on the groove forming die pin are directly reflected in the shape and number of the grooves formed on an inner circumferential surface of the cylindrical member, various shapes of grooves such as a short groove, a long groove, a V-shaped cross-sectional groove, a U-shaped cross-sectional groove, a semicircular cross-sectional groove and the like and a desired number of the grooves can be efficiently formed by appropriately forming the shape and the number of groove forming protrusions provided on the groove forming die pin.

Further, since a groove forming die pin including a plurality of groove forming protrusions on a front side portion of the outer circumferential surface is pushed into a cylindrical member from the tapered inner circumferential surface side of the cylindrical member to provide a plurality of grooves on the inner circumferential surface of the cylindrical member, it is easy to form grooves each starting from the inside of the cylindrical member. Further, since the sealing of the end portions of the grooves is performed by returning and straightening a tapered inner circumferential surface of the cylindrical member to a straight cylindrical surface, a pressing force for returning and straightening the tapered inner circumferential surface of the cylindrical member is concentrated on an end portion of the tapered inner circumferential surface so that the straightening of the tapered inner circumferential surface by plastically deformation is started from this end portion. Thus the tapered inner circumferential surface can be easily returned and straightened without the necessity of a large pressing force.

Since the cylindrical bearing according to the invention can be continuously subjected to extrusion, taper forming, groove forming, returning and straightening, bottom removing and the like from a cylindrical crude material blank, a cylindrical bearing member can be efficiently manufactured from a circular column-shaped crude material by a series of forging steps.

Further, since the cylindrical bearing member according to a second embodiment of the invention can be simultaneously subjected to molding and groove forming of the cylindrical member by an extrusion process, a cylindrical bearing member can be efficiently manufactured from a circular column-shaped crude material blank by reduced steps in addition to the effects in the above-mentioned method of making a cylindrical bearing member.

Further, the cylindrical bearing member according to a third embodiment of the invention can be simultaneously subjected to groove forming and taper forming of the cylindrical member, a cylindrical bearing member can be efficiently manufactured from a circular column-shaped crude material blank by reduced steps in addition to the effects in the above-mentioned method of making a cylindrical bearing member.

BEST MODE FOR CARRYING OUT THE INVENTION

A first embodiment of the present invention will be described with reference to FIGS. 1 to 15.

Figure 1:
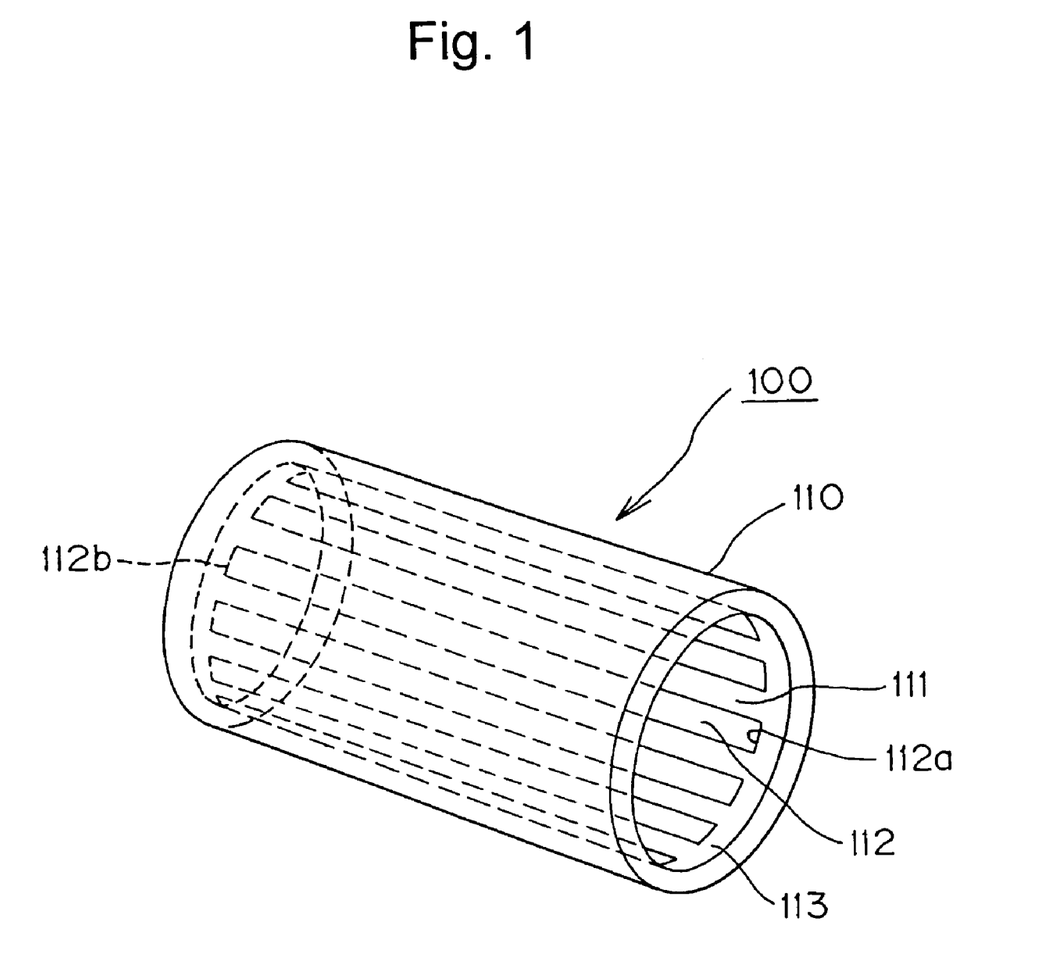
FIG. 1 is a perspective view of a cylindrical bearing member made according to the present invention.

First, in the cylindrical bearing member 100 according to the present invention, as shown in FIG. 1 a number of blind grooves 112 as oil reservoirs are formed on the inner circumferential surface 111 of seamless cylindrical member 110 by use of a groove forming die pin. Each of these blind grooves 112 as oil reservoirs has a groove form with the longitudinal proximal end portion 112a and terminal portion 112b of the blind groove 112 sealed. The sealing of said proximal end portion 112a is performed by a returned and straightened portion 113 obtained by returning and straightening a tapered inner circumferential surface portion of the cylindrical member to a cylindrical shape, thereby providing a work-hardened ring at the proximal end.

Therefore, when a shaft, a pin or the like inserted cylindrical bearing member 100 of the example 1 is used as a sliding or rotary bearing, the blind grooves 112 as oil reservoirs are open on only the inner circumferential surface 111 of the cylindrical member 110 with the blind grooves 112 opposed to each other. Thus, lubricating oil in the blind grooves 112 as oil reservoirs is held without flowing out of the longitudinal proximal work-hardened end portion 112a and terminal portion 112b even in long-time use, so that excellent lubricity is maintained.

Figure 2:
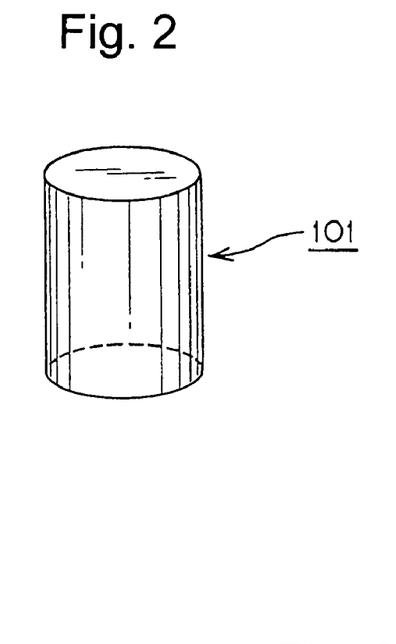
FIG. 2 is a front view of a circular column-shaped blank in the first embodiment of the present invention.
Figure 3:
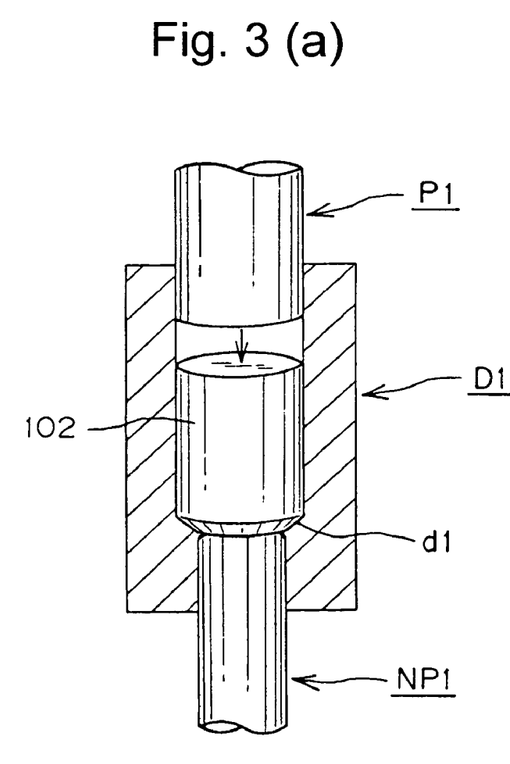
FIGS. 3(a) and 3(b) are explanatory views of an upsetting step in the first embodiment of the present invention.
Figure 4:
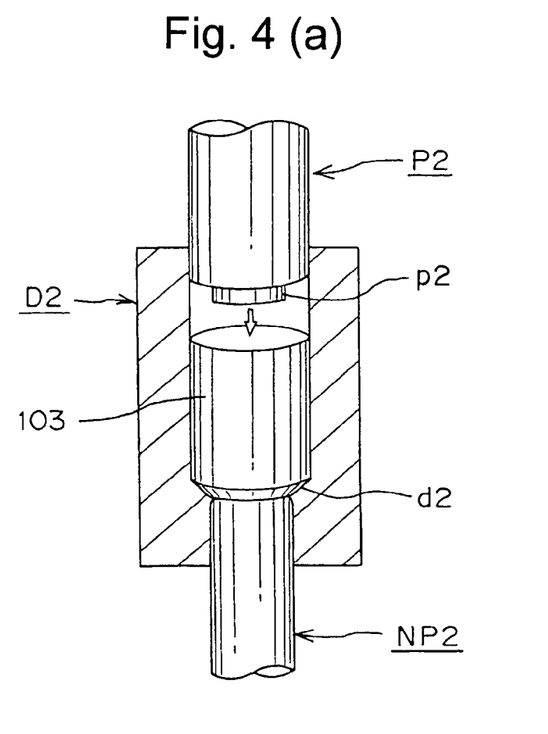
FIGS. 4(a) and 4(b) are explanatory views of a centering step in the first embodiment of the present invention.
Figure 5:
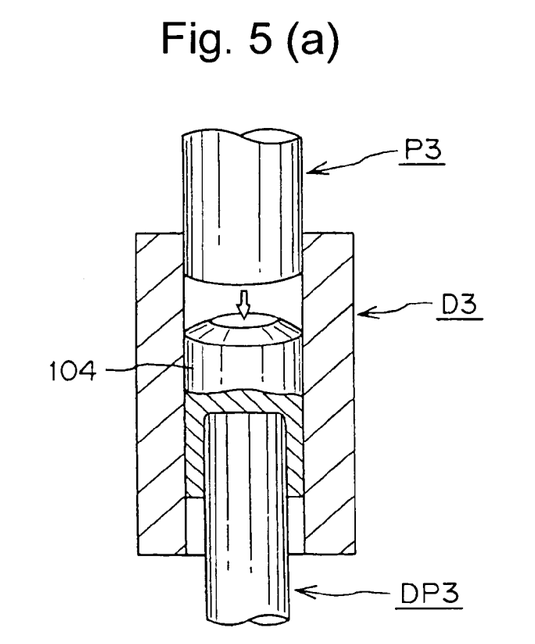
FIGS. 5(a) and 5(b) are explanatory views of a primary extrusion step in the first embodiment of the present invention.
Figure 6:
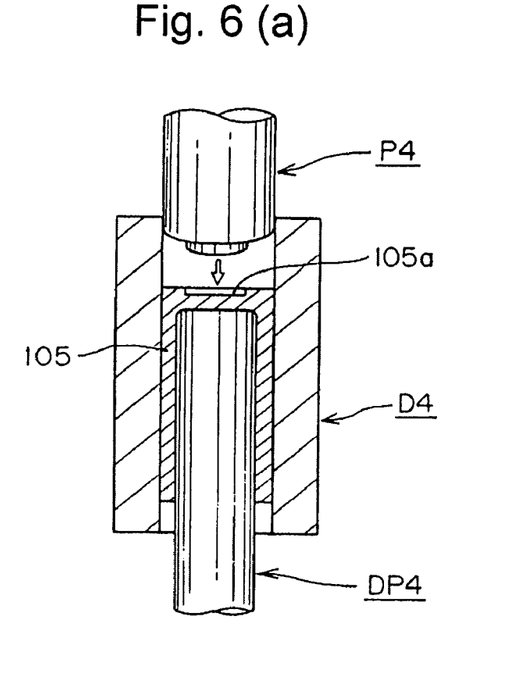
FIGS. 6(a) and 6(b) are explanatory views of a secondary extrusion step in the first embodiment of the present invention.
Figure 7:
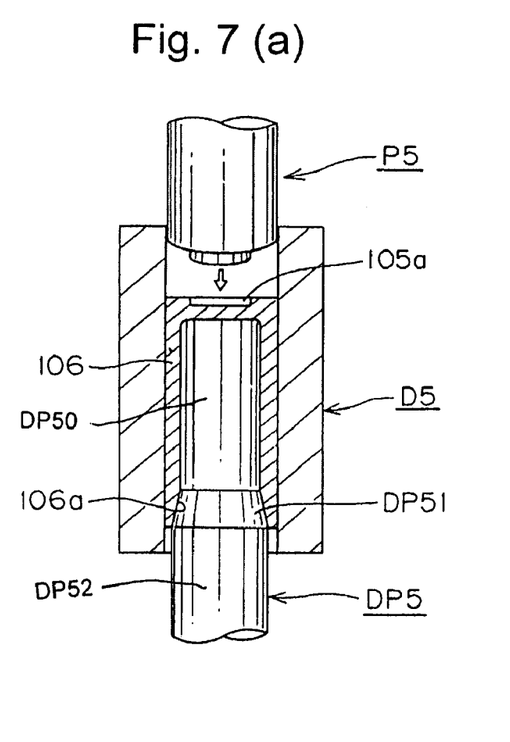
FIGS. 7(a) and 7(b) are explanatory views of a taper forming step in the first embodiment of the present invention.
Figure 8:
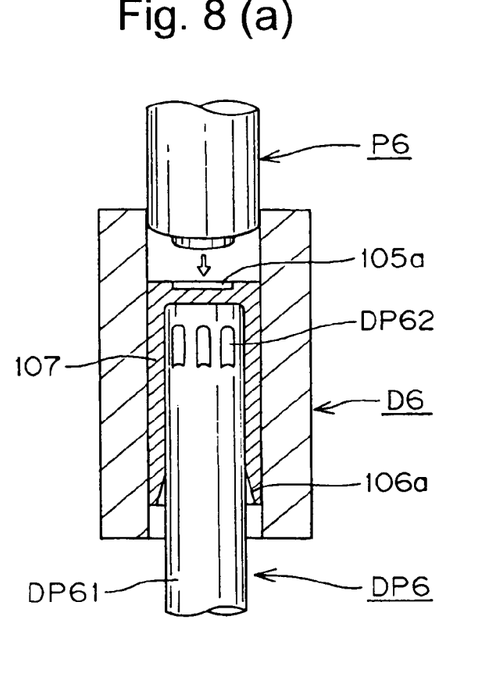
FIGS. 8(a) and 8(b) are explanatory views of a blind groove forming step in the first embodiment of the present invention.
Figure 9:
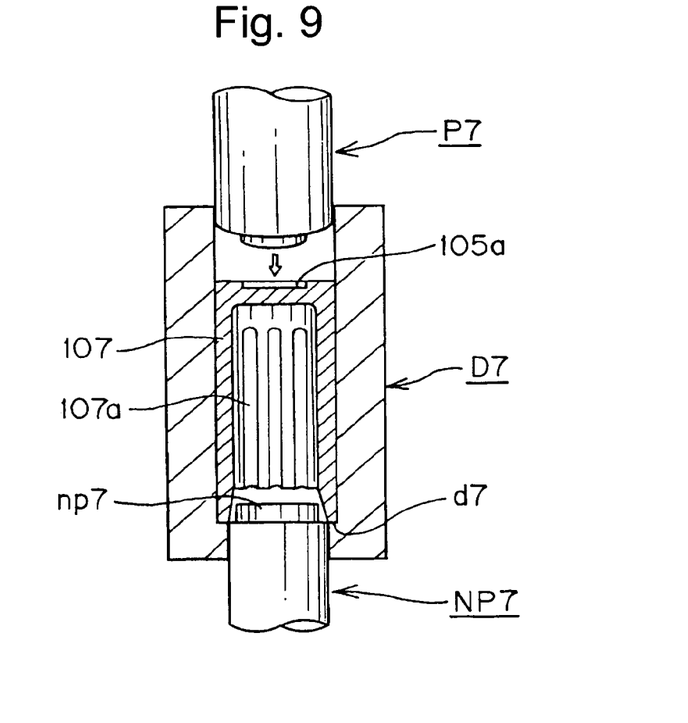
FIG. 9 is an explanatory view of a returning and straightening step in the first embodiment of the present invention.
Figure 10:
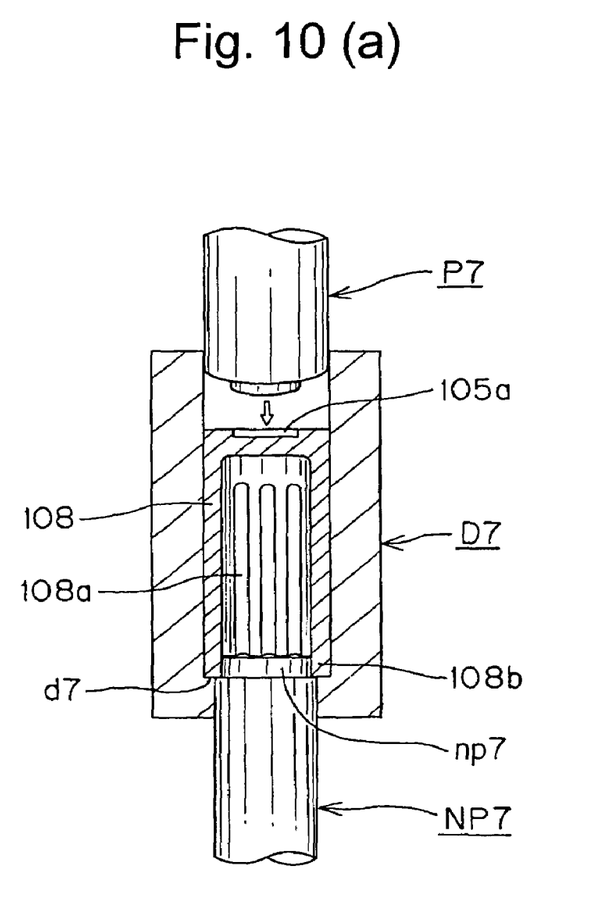
FIGS. 10(a) and 10(b) are explanatory views of a returning and straightening step in the first embodiment of the present invention

Thus, in a method of manufacturing the cylindrical bearing member 100 according to the first embodiment, a circular column-shaped blank 101 obtained by cutting a bar steel to predetermined length as shown in FIG. 2 is sequentially subjected to forging processes such as an upsetting step, a centering step, a primary extrusion step, a secondary extrusion step; a bottom removing step and the like as shown in FIGS. 3 to 7, groove forming as shown in FIG. 8, and returning and straightening as shown in FIGS. 9 and 10. These working steps will be described below in detail.

Namely, the circular column-shaped blank 101 obtained by cutting a bar steel to predetermined length, which is a circular column-shaped crude material as shown in FIG. 2 is pushed into a cylindrical die D1 for a blank with an inner step d1 by a punch P1 for a blank in the upsetting step as shown in FIG. 3(a), and after the upsetting, an upset circular column-shaped blank is taken out of the cylindrical die D1 for the blank by a knockout pin NP1 so that an outer circumferential surface and cut end surface-straightened cylindrical blank 102 as shown in FIG. 3(b) are obtained.

Then, in the centering step as shown in FIG. 4(a), the circular column-shaped blank 102 obtained by the above-mentioned upsetting, is pushed into a centering cylindrical die D2 with an inner step d2 by a centering punch P2 while turned upside down, and after the centering of the circular column-shaped blank 102 with a disk-shaped protrusion p2 of a centering punch P2 is completed, an upset circular column-shaped blank is taken out of the centering cylindrical die D2 by a knockout pin NP2 so that a circular column-shaped member 103 with a concave portion on one end surface of which a concave portion 103a is formed as shown in FIG. 4(b) is obtained.

In the primary extrusion step as shown in FIG. 5(a), the circular column-shaped member 103 with the concave portion obtained by the above-mentioned centering is again pushed into an extruding cylindrical die D3 by an extruding punch P3 with the member turned upside down, and is subjected to a primary extrusion in a state where it abuts on a die pin DP3 fixed to the inside of the extruding cylindrical die D3 and then the extruded cylindrical member is removed from the extruding cylindrical die D3, so that a cylindrical member 104 with a thick bottom in which a bottom portion 104a of thick wall as shown in FIG. 5(b) is formed, is obtained. The die pin DP3 has a given diameter corresponding to the diameter of the bore of the bearing member 100.

Further, in a secondary extrusion step as shown in FIG. 6(a), the cylindrical member 104 with a thick bottom obtained by the above-mentioned primary extrusion is pushed into an extruding cylindrical die D4 by an extruding punch P4 and is subjected to the secondary extrusion while the cylindrical member 104 is brought into contact with an extruding die pin DP4 fixed to the inside of the extruding cylindrical die D4. After that the secondary extruded cylindrical member 104 is taken out of the extruding cylindrical die D4 and a cylindrical member 105 with a thin bottom in which a thin wall bottom portion 105a is formed as shown in FIG. 6(b) is obtained.

Next, the shaped seamless cylindrical member subjected to forging processes such as the above-mentioned upsetting step, centering step, primary extrusion step, secondary extrusion step, and the like is subjected to a taper forming step, a groove forming step and a returning and straightening step, which are the most significant in the present invention.

First, in a taper forming step as shown in FIG. 7(a), the cylindrical member 105 with thin bottom obtained by the above-mentioned secondary extrusion is pressed into a taper forming cylindrical die D5 by a taper forming punch P5. It is noted that the die D5 has a bore with straight cylindrical walls longer in an axial direction than the length of the member 105. Further, a taper forming die pin DP5 fixed to the inside of the taper forming cylindrical die D5 is pressed so that the open end 106a of the cylindrical member 105 is tapered by a tapered portion DP51 provided in the taper forming die pin DP5. The pin DP5 has a straight cylindrical leading end DP50 and a larger diameter trailing end DP52 with a gradually-tapered circumferential intermediate portion DP51 in a straight-walled frusto-conical form between the leading and trailing ends. At the leading end of the pin DP5, it has the given diameter corresponding to the bore of the member 100, and at the trailing end it is gradually tapered to a larger diameter. After that, the cylindrical member 105 is removed from the taper forming cylindrical die D5 to obtain a tapered cylindrical member 106 including a tapered inner circumferential surface portion 106a at an end portion of the member with gradually diameter-reduced from the open end toward the inside as shown in FIG. 7(b). The outer surface of the member 106 surrounding the tapered portion 106a continues the same outer straight cylindrical diameter, since it is confined within the extended bore of the die D6.

Next, in a groove-forming step as shown in FIG. 8(a), the above-mentioned tapered cylindrical member 106 is pushed into a groove forming cylindrical die D6 by a groove-forming punch P6. At the other end, a groove-forming die pin DP6 fixed to the inside of the cylindrical die D6 is pressed into the open end of the tapered cylindrical member 106.

In this case, the groove-forming die pin DP6 includes a plurality of groove-forming protrusions DP62 on an outer circumferential surface of a circular column-shaped body DP61, and the perimeter of the protrusions, defined by a hypothetical circle obtained by connecting outer circumferential surfaces of the protrusions DP6, has a smaller diameter than the inner diameter of the large end of the tapered inner circumferential surface at the trailing end of the die pin DP6, and has a larger diameter than the given inner diameter of the cylindrical member 106.

Therefore, when the groove-forming die pin DP6 is pressed into the cylindrical member 106 from the tapered inner circumferential surface 106a side, grooves 107a are formed on a straight extending inner circumferential surface of the cylindrical member 106 which extends inwardly from the tapered portion and the grooves are formed by the groove-forming protrusions DP62 and extend from a reduced diameter end portion of the tapered inner circumferential surface 106a toward the bottom portion 105a of the cylindrical member 106 so that as shown in FIG. 8(b), the pin DP6 produces a tapered cylindrical member 107 in which end portions of the grooves 107a are sealed at the end adjacent the end wall of the cylindrical member and are open in the tapered inner circumferential surface 106a side thereof.

In a returning and straightening step as shown in FIGS. 9 and 10, the above-mentioned grooved tapered cylindrical member 107 is pushed into a returning and straightening cylindrical die D7 provided with an inner step d7 as shown in FIG. 9. The pushing is done by a returning and straightening punch P7 so that the tapered inner circumferential surface 106a is returned and straightened between a disk-shaped protrusion np7 of a returning and straightening knockout pin NP7 and the returning and straightening cylindrical die D7. The protrusion np7 has a diameter equal to the interior diameter of the member 107. As a result a returned and straightened cylindrical portion 108b having the same inner and outer surfaces as those of the cylindrical member 107 is formed as shown in FIG. 10(a) while the grooves 107a in the tapered inner circumferential surface end are sealed by the returned and straightened portion 108b which provides a work-hardened ring at the one end of the member 107. After that the returned and straightened cylindrical member 107 was removed from the returning and straightening cylindrical die D7 by the knockout pin NP7. Then a blind grooved cylindrical member 108 provided with a plurality of blind grooves 108a sealed with the returned and straightened portion 108b in an end portion in the longitudinal direction of the groove, on the inner surface of the cylindrical member is obtained as shown in FIG. 10(b).

The above-mentioned returned and straightened blind grooved cylindrical member 108 is pushed again into a bottom-removing and straightening cylindrical die D8 by a bottom-removing and straightening punch P8 in bottom-removing and straightening steps as shown in FIG. 11(a) with the cylindrical member turned upside down, so that it is simultaneously subjected to a bottom removing process in which the thin wall bottom portion 105a is removed and to a straightening process for the inner and outer circumferential surfaces by a bottom removing and straightening die pin DP8 fixed to the inside of the bottom removing and straightening cylindrical punch D8. After that the cylindrical member 108 is removed from the bottom removing and straightening cylindrical die D8. Then a cylindrical bearing member 100 including a plurality of blind grooves 112 as oil retainers on the inner circumferential surface as shown FIG. 1 is obtained as shown in FIG. 11(b).

Figure 12:
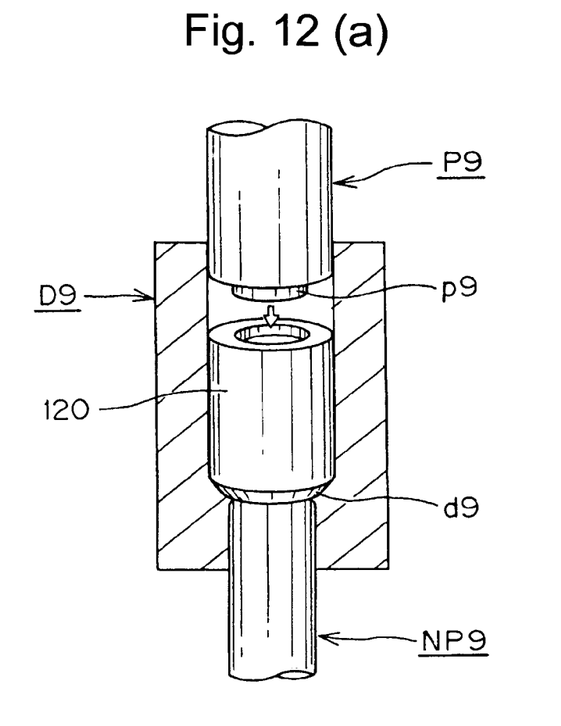
FIGS. 12(a) and 12(b) are explanatory views of an upsetting and centering step in the second embodiment of the present invention.
Figure 13:
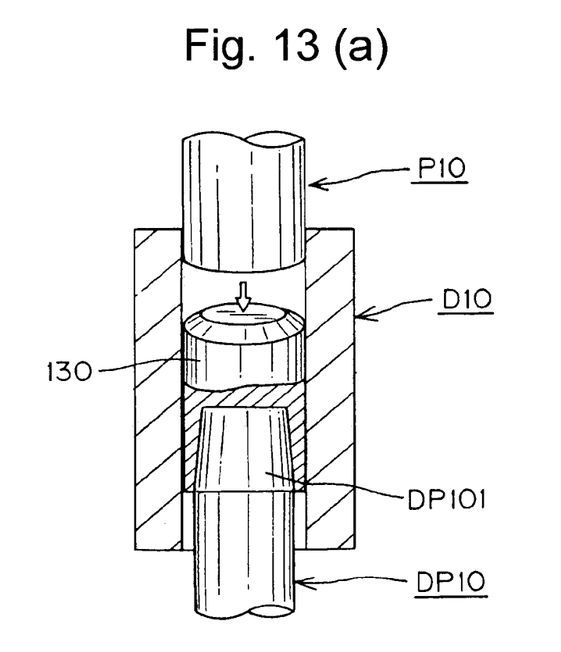
FIGS. 13(a) and 13(b) are explanatory views of a primary extrusion and taper forming step in the second embodiment of the present invention.
Figure 14:
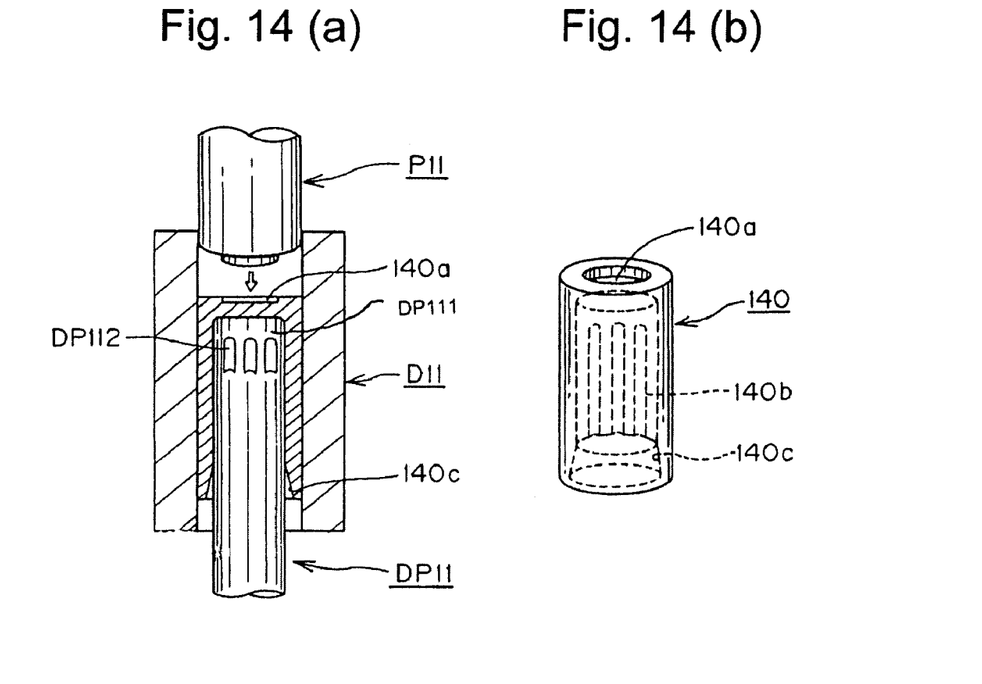
FIGS. 14(a) and 14(b) are explanatory views of a secondary extrusion and groove forming step in the second embodiment of the present invention.

Next, a cylindrical bearing member, made in accordance with a second embodiment of the invention, will be described with reference to FIGS. 12 to 14. This cylindrical bearing member of the second embodiment is subjected to a centering step in the above-mentioned first example for short time and at the same time to an upsetting step, and subjected to a taper forming step for short time and at the same time to a primary extrusion step, and then is subjected to a blind grooving step for short time and at the same time to a secondary extrusion step. The returning and straightening step and the bottom removing and straightening step shown in FIGS. 9 and 10, subsequent to the groove forming step is the same as in the first example. Thus, upsetting and centering steps, primary extrusion and taper forming steps and secondary extrusion and groove forming steps will be described below.

First, a circular column-shaped blank 101, which is a circular columnar crude material, cut to a predetermined length from a bar-shaped member as shown in FIG. 2 is pushed into a cylindrical die D9 for a blank, including an inner step by an upsetting and centering punch P9 with a disk-shaped protrusion p9 at its tip in upsetting and centering steps as shown in FIG. 12(a). Then after the circular column-shaped blank 120 was subjected to the upsetting and centering, it is removed from the upsetting and centering cylindrical die D9 by a knockout pin NP9 so that the outer circumferential surface and a cut end surface are straightened. Thus a circular column-shaped member 120 with a concave portion in which a concave portion 120a is formed on an end surface, is obtained as shown in FIG. 12(b).

Then, in the primary extrusion step as shown in FIG. 13(a), the circular column-shape member 120 with the concave portion obtained by the above-mentioned upsetting and centering is pushed into an extruding cylindrical die D10 by an extruding punch P10 with the member turned upside down, and is subjected to such a primary extrusion that a cylindrical portion including a tapered inner circumferential surface having gradually reduced diameter inward in a state where it abuts on an extruding die pin DP10 including a tapered portion DP10 having gradually reduced diameters toward the tip portion, fixed to the inside of the extruding cylindrical die D10 and then the extruded cylindrical member is removed from the extruding cylindrical die D10, so that a cylindrical member 130 with a thick bottom, which is comprised of a cylindrical portion 130c including a thick wall bottom portion 130a and a tapered inner circumferential surface 130b having gradually reduced diameter inward as shown in FIG. 13(b), is obtained.

And in a secondary extrusion step as shown in FIG. 14(a), when the cylindrical member 130 with a thick bottom obtained by the above-mentioned primary extrusion is pushed into an extruding and groove forming cylindrical die D11 by an extruding and groove forming punch P11, a secondary extrusion process is made while the inner bottom surface of the cylindrical member 130 with a thick bottom is brought into contact with an extruding and groove forming die pin DP11 fixed to the inside of the cylindrical die D11.

The extruding end groove forming die pin DP11 includes a leading end Dp111 with a given diameter corresponding to the bore of the bearing member 100, and a plurality of groove forming protrusions Dp112 on the outer circumferential surface of the circular column-shaped body DP111. The groove forming protrusions Dp112 relatively slide with an extension of the cylindrical portion of the die pin DP11 while a secondary extrusion in which a thick bottom is thinned so that a continuous straight cylindrical portion is formed or elongated from a tapered inner circumferential surface, is performed, whereby a hollow cylindrical member 140 in which an end is sealed, tapered portion 140c side-opened grooves 140b are formed and a thin wall bottom portion 140a, grooves 140b and tapered inner circumferential surface 140c are provided as shown in FIG. 14(b), is obtained as in the first embodiment. It is noted that when the leading end DP111 of the die pin DP11 is pushed into the thick bottom to form a thin bottom, the displaced material elongates the member 130 shown in FIGS. 13a and 13b to be molded into the longer member 140 shown in FIGS. 14a and 14b.

After that the tapered cylindrical member 140 having a thin bottom and grooves obtained by the above-mentioned groove forming process is subjected to returning and straightening, bottom removing and straightening as in the first example so that the cylindrical bearing member 100 shown in FIG. 1 is obtained.

Figure 11:
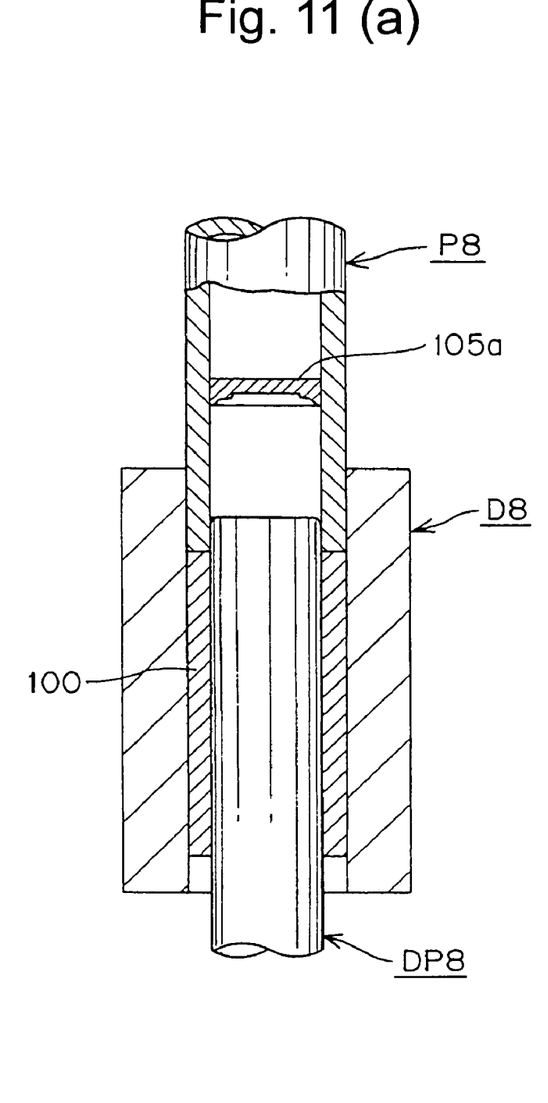
FIGS. 11(a) and 11(b) are explanatory views of a bottom removing and straightening step in the first embodiment of the present invention.
Figure 15:
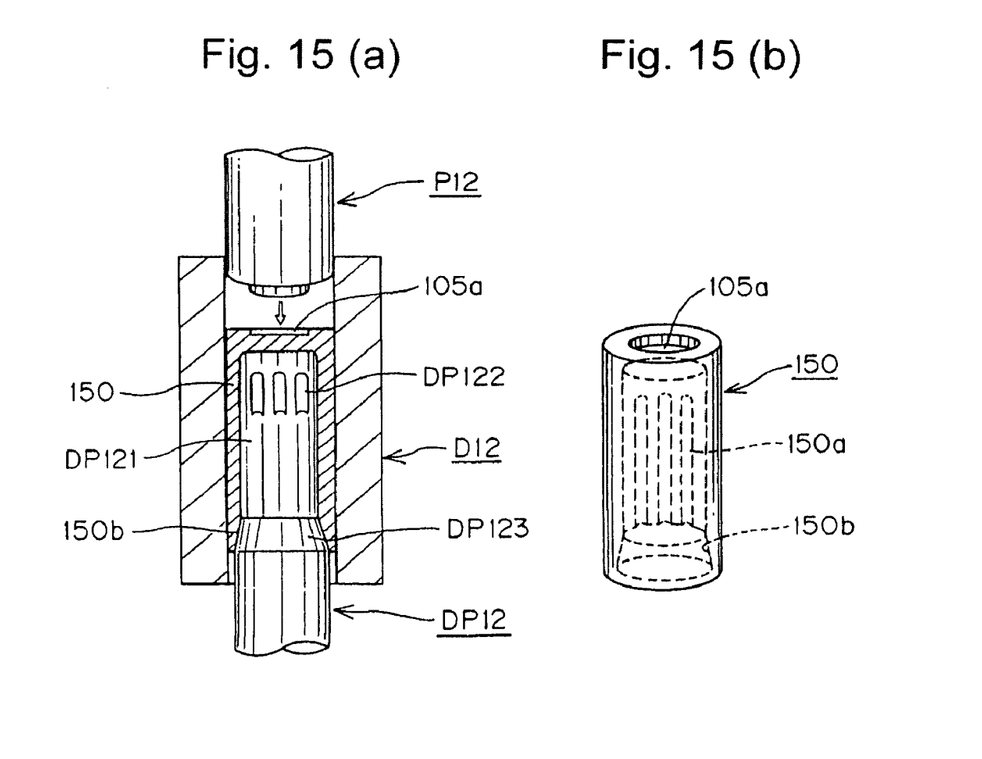
FIGS. 15(a) and 15(b) are explanatory views of a groove forming and taper forming step in the third embodiment of the present invention.

Further, a cylindrical bearing member, which is a third embodiment of the present invention will be described with reference to FIG. 15. In the cylindrical bearing member of this third embodiment, the groove forming step in the above-mentioned first embodiment is shortened and it is simultaneously attained together with tapering. The forging process composing of the upsetting step, the centering step, the primary extrusion step, the secondary extrusion step and the like, the returning and straightening step as shown FIGS. 9 and 10, subsequent to the groove forming step, and the bottom removing and straightening step as shown in FIG. 11, are the same as those in the first example. Thus, only the tapering step and groove forming step will be described below.

The cylindrical member 105 with thin bottom in which a thin wall bottom portion 105a is formed, is pushed into a taper forming and groove forming cylindrical die D12 by a taper forming and groove forming punch P12 in a taper forming step and a groove forming step as shown in FIG. 15(a) and a taper forming and groove forming cylindrical die DP12 fixed to the inside of the cylindrical die 12 is pushed into the cylindrical member 105 with thin bottom from an opening of the cylindrical member 105.

In this case, the taper forming and groove forming die pin DP12 includes a plurality of groove forming protrusions DP122 on a leading portion in an outer circumferential surface of a cylindrical body DP121 and includes a tapered portion DP123 on a trailing portion of the cylindrical body DP121 with the outer diameters gradually reduced backward. Thus, when the taper forming and groove forming die pin DP12 is pushed into the cylindrical member 105, the groove forming protrusions 122 of the taper forming and groove forming die pin DP12 forms grooves 150a on the inner circumferential surface of the cylindrical member 105 from the open end toward the bottom wall portion 105a of the cylindrical member 105. Further, when the taper forming and groove forming die pin DP12 reaches the tapered portion DP123 provided at a rear portion of the groove forming protrusions 122, the tapered portion DP123 forms a tapered inner circumferential surface 150b, which is gradually diameter-reduced from the open end toward the inside, while crushing the grooves near the opening end so that a tapered cylindrical member 150 is obtained in which grooves whose ends at the bottom wall end of the cylindrical member are sealed and whose opposite ends are open in the tapered inner circumferential side 150b, as shown in FIG. 15(b).

After that the tapered cylindrical member 150 having a thin bottom and grooves, obtained by the above-mentioned taper forming and groove forming is subjected to returning and straightening and to bottom removing and straightening so that a cylindrical bearing member 100 shown in FIG. 1 is obtained.

In the pipe-shaped seamless cylindrical bearing member 100 of the thus obtained present example, there are a number of blind grooves 112 as oil reservoirs with closed proximal terminals 112a and closed distal terminals 112b in the longitudinal direction of the blind groove. The grooves are formed on an inner circumferential surface 111 of the cylindrical member 110, and when a lubricating oil is poured into such blind grooves 112 as oil reservoirs, the oil is held for a long period of time whereby a lubricating function can be sufficiently exhibited and a blind groove as an oil reservoir can be efficiently mass-produced inside the cylindrical member 110 at low cost. Thus, the advantages of the invention are very large.

It is noted that although, each of the cylindrical bearing members of all of the embodiments as described above uses a cylindrical die, if the inside surface of the die is cylindrical, the outer shape of the die may use appropriate shapes in accordance with a forging apparatus used to produce a bearing member having a cylindrical outline. If a non-cylindrical outline is desired, the bore of the die may be non-cylindrical.

The invention claimed is:

1. A method of making a cylindrical bearing member on whose inner circumferential surface a plurality of blind grooves for oil reservoirs are provided, comprising the steps of extrusion molding a circular column-shaped crude material into a hollow cylindrical member with a thin bottom at one end and an open end at the other, the hollow member including a straight cylindrical outer surface from said thin bottom to said open end, and an intermediate tapered inner circumferential surface in a straight-walled conical form, having a large diameter at its open end, and a gradually reduced diameter terminating in a small diameter towards said bottom; placing said hollow member in a die having a straight cylindrical bore longer than said hollow member, and pushing a groove forming die pin including a plurality of groove forming protrusions with an outer perimeter less than said large diameter and greater than said small diameter, from said open end toward said bottom to form a cylindrical member with a thin bottom provided with a plurality of grooves on the inner circumferential surface, each of said grooves having a closed terminal adjacent said bottom wall and an open terminal in said tapered inner circumferential surface adjacent said open end, removing said die pin; and thereafter closing groove open terminals by straightening said tapered inner circumferential surface into a hollow cylindrical form of work-hardened ring having an internal diameter equal to said small diameter beyond said open terminals to close said terminals, and then removing the thin bottom from said straightened cylindrical member.

2. A method of making a cylindrical bearing member on whose inner circumferential surface a plurality of blind grooves for oil reservoirs are provided, comprising the steps of extrusion molding a circular column-shaped crude material into a hollow cylindrical member with a thick bottom at one end and an open end at the other, and including a straight cylindrical outer surface from said thick bottom to said open end, and an intermediate tapered inner circumferential surface in a straight-walled conical form having a large diameter at its open end, and a gradually reduced diameter; terminating in a small diameter towards said bottom; placing said hollow member in a die having a straight cylindrical bore longer than said hollow member, and pushing a groove forming die pin including a plurality of groove forming protrusions with an outer perimeter less than said large diameter and greater than said small diameter on an outer circumferential surface into said thick bottom to make the thick bottom thin; while forming and elongating said member at the inner end of said tapered inner circumferential surface into a straight cylindrical member, whereby the cylindrical member with thick bottom is molded into a cylindrical member with a thin bottom and a plurality of grooves on the inner circumferential surface of said member, each of said grooves having a closed terminal in said straight cylindrical portion adjacent said bottom and an open terminal in said tapered inner circumferential surface portion; then removing said groove forming die pin, then returning and straightening said tapered inner circumferential surface to a hollow cylindrical shape of work-hardened ring having an internal diameter equal to said small diameter beyond the open terminals of the grooves to close said open terminals and removing said thin bottom of the returned and straightened cylindrical member with thin bottom.

* * * * *

UNITED STATES PATENT AND TRADEMARK OFFICE
CERTIFICATE OF CORRECTION

PATENT NO. : 7,594,332 B2
APPLICATION NO. : 11/107768
DATED : September 29, 2009
INVENTOR(S) : Hirofumi Miki It is certified that error appears in the above-identified patent and that said Letters Patent is hereby corrected as shown below:

On the Title Page, Item (54) and Col. 1 lines 1-2

The title should be: --Method for Making a Cylindrical Bearing--.

Signed and Sealed this

Twelfth Day of January, 2010

David J. Kappos
*Director of the United States Patent and Trademark Office*